July 3, 1928.
C. WEISMANN
1,675,678
EXPLOSION MOTOR TO BE UTILIZED UNDER VARIOUS ATMOSPHERIC CONDITIONS
Filed Nov. 12, 1917
Fig. 1
Fig. 2
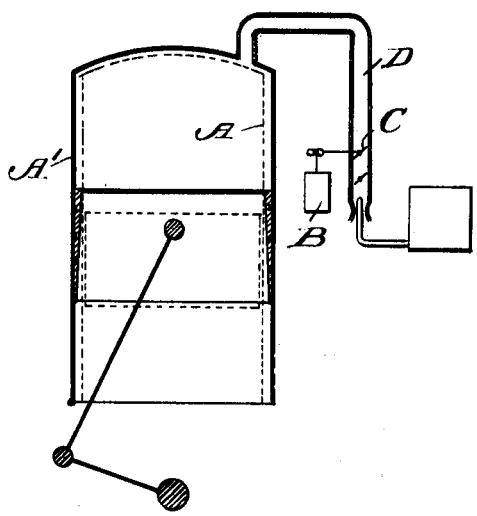
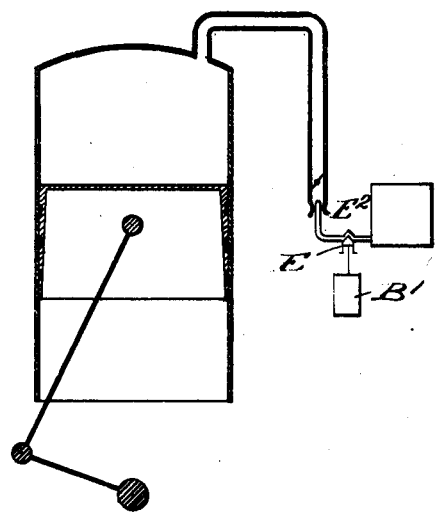
Fig. 3.
Fig. 4.
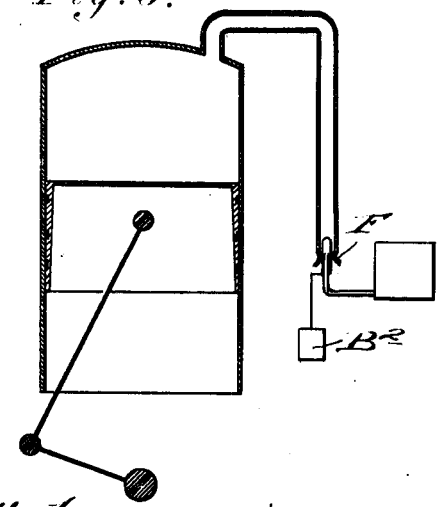
Witnesses:
Inventor
Charles Weismann Patented July 3, 1928.

1,675,678

UNITED STATES PATENT OFFICE.

CHARLES WEISMANN, OF PARIS, FRANCE. ASSIGNOR TO HUGO JUNKERS, OF DESSAU, GERMANY.

EXPLOSION MOTOR TO BE UTILIZED UNDER VARIOUS ATMOSPHERIC CONDITIONS.

Application filed November 12, 1917, Serial No. 201,671, and in France November 23, 1915.

This invention relates to explosion motors, and particularly to those used for aerial navigation, which operate under varying atmospheric conditions, and especially under varying barometric pressures.

It is well known that varying barometric pressures affect considerably the horsepower developed by such motors, it having been found that as an aeroplane ascends, the power of its motor diminishes, and vice-versa.

Attempts have been made to compensate for these phenomena, it having been proposed to add to ordinary motors of the kind in question, particularly to those for aeroplanes, a system which would permit superfeeding such motors according to altitude; that is the intake air was to be introduced under pressure into the motors at the higher altitudes, the air to be so introduced that the intake pressure and consequently the weight of each charge would remain constant until a very high altitude is attained, the object being to increase either the maximum altitude which an aeroplane can attain, the speed of an aeroplane at high altitudes, or to increase the load which an aeroplane would be able to carry.

Also it has been proposed to provide the ordinary aeroplane with pistons which provide a more restricted combustion chamber than those usually employed, so that the ratio between the volume of such combustion chamber and the volume of air taken in at each suction stroke may be a little greater than that required for operation at the ground level.

The first mentioned method shall probably never be put in practice without overcoming great difficulties, and such method shall in any case require the employment of apparatus which would be delicate, relatively heavy and very costly.

The second mentioned method would be easier to realize; but if it is possible to obtain increase of power in the manner proposed, such increase would only be relatively small and would be at the expense of the durability of the motors; the motors having at the ground level an excessively high volumetric compression, so that they would not operate efficiently at the ground level, and furthermore, such motors would be subject to excessive wear.

The primary object of the present invention is to remedy these latter objections.

The present invention utilizes a supercompression motor in conjunction with means which is operative to prevent such supercompression taking place while the atmospheric conditions are such as would produce such supercompression; in consequence of which the invention enables aeroplane motors to be used which have a very much higher supercompression than has heretofore been possible, and such motors will utilize their supercompression to the highest degree and to the best advantage.

As an example in the carrying out of the invention, let it be supposed, for instance, that a motor is to be constructed which has to be put on an aeroplane intended to fly chiefly at an altitude of 2.500 meters above sea-level, and that the aeroplane, (the latter and its propeller being constructed accordingly) is to fly at a speed (relatively to the wind) of 35 meters per second. Heretofore, the procedure would have been as follows: The motor would be so designed that it may have, at such altitude, the horse-power X necessary to obtain the said speed; and since motors of this class always operate at full feeding of the fuel when at their normal height (here at 2.500 meters above sea-level), the designing and construction of the motor must be such that the motor may be able to withstand, at the ground level forces and strains much greater than the normal forces and strains which take place at the normal height of 2.500 meters above sea-level, and will also develop at sea-level (full intake being supposed) more horse power than the normal which has been termed X; i. e. at sea-level the motor will furnish an excess power above X. Such excess power may be termed Y so that the total horse power at the sea-level may be termed as a horse-power equal to X plus Y. In view of the fact that the weight of the motor varies in accordance with the strains to be imposed upon it or else with its horse-power, the motor designed and constructed as just described would be relatively heavy.

According to the present invention, on the contrary, the calculation of the volumetric compression of the motor is done as before, i. e. performed with the view to a good functioning at the normal high altitude, that is, on the one hand a sufficient diameter for the cylinders is chosen so as to obtain the normal horse power X at the normal height in spite of the rarefaction of air at such height, and, on the other hand, a sufficiently restricted compression chamber is determined, so that the motor would once again furnish the too strong power X plus Y on the ground level, but at the same time, means is combined either with the motor itself, or with its accessories, which operate to prevent the motor from developing a horse-power greater than X when at a lower level than said normal level of 2.500 meters. Such means is preferably under the control of a barometrical or manometrical system, so that it acts automatically. Consequently the motor, according to the present invention, is designed and constructed in such a way that, although it would have a bore and stroke that would render it capable of developing a horse-power equal to X plus Y, it will never develop a horsepower above X; therefore the strains which would be produced if a horse-power of X plus Y were developed, will never occur, and the weight of the motor may be reduced substantially from what would be required if the motor were permitted to develop the full power of which it would be capable at the ground level.

Different means may be provided for controlling the horse-power developed by the motor. For instance a barometrical or manometrical system may be employed which comprises one or more Vidi's capsules, such as those used in aneroid barometers; such capsules being so arranged that they act either on means to control the flow of the gases, or on means to control the flow of the fuel oil or the intake air, whereby as the atmospheric pressure increases, the feed of the gases, the fuel oil or the intake air is necessarily diminished or reduced, and vice-versa.

In the accompanying drawing:—

Figure 1 is a diagrammatic view showing a barometric control system for regulating the supply of the explosive mixture or gas supplied to the motor.

Figure 2 is a similar view showing a barometric control system for regulating the supply of fuel oil to the motor.

Figure 3 is a diagrammatic view showing a barometric control system for regulating the supply of fuel oil as an alternative to that shown in Figure 2.

Figure 4 is a diagrammatic view showing a barometric control system for regulating the supply of air to the carbureter of the motor.

In Figure 1 the dotted outline A represents the bore of a cylinder and the shape of the piston therein for a motor having a horse-power at the ground level equal to X. The full line outline A' represents the bore of a cylinder and the shape of the piston therein, for a motor which will develop a horse-power equal to X when at an altitude $h$, which is termed the "normal" altitude for said motor and corresponds to a normal outer or barometric air pressure. In the motor represented by the full lines, the cylinder bore is greater and its compression pressure is higher than is the case with the motor represented by the dotted lines, as the piston in the full line outline moves further into its cylinder, and in consequence, the motor represented by the full lines, and which has a horse-power equal to X at the normal altitude $h$ would develop a greater power than X at the ground level, if the air intake were not restricted in accordance with the increase in barometric pressure when the motor is descending from said normal altitude to lower altitudes. According to this invention, the motor is so designed and constructed that, at the normal altitude $h$ it will admit the air at its natural or barometric air pressure which will neither be increased through a pumping action nor diminished through throttling, and will under these normal conditions have a horse-power equal to X, and barometrically-controlled means is provided for preventing the motor from exceeding a horse-power greater than X when operating at an altitude below said normal altitude. This is accomplished by restricting the operation of the motor preferably automatically in accordance with the increases in barometric-pressure due to decreasing altitudes, so that, irrespective of the increases that may exist in the barometric pressure, the power developed by the motor will remain constant, notwithstanding the descent of said motor from the normal altitude to sea level, this being accomplished in such a way that the pressure at which the air is taken into the motor is always lower than the actual outside or barometric pressure, except when the motor is operating at the normal altitude or at altitudes above such normal altitude. For example, in Figure 1, the barometric control B is operatively connected to a supplemental throttle C which is contained in the fuel mixture intake D of the motor, whereby the throttle C will automatically reduce the amount of explosive mixture supplied to the motor as the barometric pressure increases and vice versa. In Figure 2 the barometrical control B' is operatively connected to a valve E contained in a pipe $E^2$ through which the fuel oil flows to the intake of the motor, whereby the supply of fuel oil is reduced automatically when the barometric pressure increases, and vice versa. In Figure 3, the barometric control $B^2$ is operatively connected to the axially-slidable spray nozzle F of the carbureter whereby the level at which the jet enters into the intake of the motor may be varied and hence the amount of fuel oil supplied to the motor will be automatically reduced as the barometric pressure increases, and vice versa. Figure 4 shows the barometrical control B³ operatively connected to a valve G which latter regulates the amount of air entering the motor through the air intake H, whereby the amount of air supplied to the motor to form part of the explosive mixture will be reduced automatically as the barometric pressure increases, and vice versa. In each instance, the automatic control will be so adjusted that the motor will receive its full supply of normal explosive mixture when it is at its normal altitude, but the motor will be unable to develop a horse-power exceeding X due to the relatively low barometric pressure and hence the relative rareness of the air at said normal altitude; while on the other hand the supply of the explosive mixture going to the motor will be reduced as the altitude diminishes, and hence the motor will be prevented from developing a horse-power exceeding X, notwithstanding the increase in the density of the air at the lower altitude.

In each instance above described, the explosive mixture supplied to the motor is impoverished or reduced as the barometric pressure increases, and vice versa, with the result that at the lower altitudes or the ground level, the effect of the restricted combustion chamber, or in other words the supercompression of the motor is reduced or eliminated, thus preventing the motor from developing a power in excess of that which it will develop at the predetermined normal altitude for which such supercompression was calculated, while on the other hand, if it is supposed that the motor is rising from sea level, as the altitude at which the motor is operating increases, the amount of the attained supercompression of the motor is automatically increased by a fuller and less impeded supply of the explosive mixture, in consequence of which the reduction in the weight of the air taken in at the higher altitudes, due to the reduced barometric pressure, is compensated for and hence the power developed by the motor remains constant, or substantially so.

It has been previously proposed to automatically adjust the section of the fuel jet of a carbureter by means of a barometric device, but such proposal has been made in connection with ordinary motors which are constructed to work at a given relatively low level and best at sea level, while the present invention pertains exclusively to supercompression motors, i. e., to motors working well at a given high altitude only and which would suffer at lower levels from severe strains and from pre-ignition, unless constructed in accordance with the present invention.

It has also been proposed to provide means for artificially increasing the intake air pressure above the natural air pressure, such means consisting for example in the utilizing of the speed of the aircraft or in the utilizing of pumps or air-compressors, a barometric device being then associated with these means so as to cause no difference between the natural pressure and the artificial intake air pressure when the motor operates at sea level and to create a positive difference between these pressures when said motor is operating at high altitudes. According to the preferred embodiments of the present invention, however, the artificial intake air pressure never rises above the natural pressure and the means utilized creates, at altitudes below the normal altitude, an artificial intake air pressure which is below the natural air pressure, and there is no difference created at all between said natural outer pressure and the artificial air intake pressure as soon as the motor has ascended to the normal altitude or to altitudes above said normal altitude.

I claim as my invention:—

1. In combination with a hyper-super compression internal combustion motor for high altitudes in which the volume of the compression chamber and the valve timing are maintained constant at all altitudes, and which is capable of developing a certain normal power at a predetermined normal high altitude by the full in-take of air into the motor at the natural barometric pressure corresponding to said normal high altitude and by the full utilization of the usual operative means of the motor, means automatically actuated solely by the changes in the barometric pressure and operative to hinder the development by such motor of a higher power than the said normal power, when the motor is operating at altitudes below said normal altitude where the natural barometric pressures are higher than that existing at said normal altitude.

2. The combination as described in claim 1, embodying means to cause a full intake of air to the motor at the natural barometric air pressure when said motor is operating at its predetermined normal altitude, and barometrically-controlled means for automatically hindering said full intake of air to the motor when the motor is operating at altitudes below said normal altitude.

3. The combination as described in claim 1, embodying means to cause a full intake of air to the motor at the natural barometric air pressure when said motor is operating at its predetermined normal altitude and barometrically-controlled means to hinder said full intake of air to the motor and thus maintain the power of the motor substantially constant when the motor is operating at all altitudes below said normal altitude.

4. In a carbureter, a throttle valve, manual means for manipulating said valve, and barometric means for controlling said throttle valve, said barometric means being responsive only to pressure outside of the carbureter and comprising a substantially sealed chamber containing a substantially fixed pressure therein.

5. In combination with a hyper-super compression internal combustion motor for high altitudes in which the volume of the compression chamber and the valve timing are maintained constant at all altitudes, and which is capable of developing a certain normal power at a predetermined normal high altitude by the full intake of air into the motor at the natural barometric pressure corresponding to said normal high altitude and by the full utilization of the usual operative means of the motor, means automatically actuated solely by the changes in the barometric pressure and operative to hinder the development by such motor of a higher power than the said normal power, when the motor is operating at altitudes below said normal altitude where the natural barometric pressures are higher than that existing at said normal altitude, said means consisting of a carbureter embodying a throttle valve, manual means for manipulating said valve, and barometric means for controlling said throttle valve, said barometric means being responsive only to pressure outside of the carbureter and comprising a substantially sealed chamber containing a substantially fixed pressure therein.

6. Internal combustion engine comprising a cylinder, a piston reciprocable in said cylinder, means arranged to supply said cylinder with the quantities of fuel and of air of the reduced pressure prevailing at great altitudes, which are required for the development of a predetermined number of horsepower at these altitudes, and automatically active means for varying one of said quantities at lower altitudes to the extent of keeping said number of horse-power substantially constant at all altitudes.

7. Internal combustion engine comprising a cylinder, a piston reciprocable in said cylinder, means arranged to supply said cylinder with the quantities of fuel and of air of the reduced pressure prevailing at great altitudes, said cylinder and piston having cross-sectional areas such as required for the development of a predetermined number of horse-power at these altitudes and at the corresponding low density of the charge in the cylinder, power transmitting means for converting the reciprocal movement of the piston into rotary movement, these means being as powerful as required for transmitting the output obtained at high altitude, and automatically active means for diminishing the charge of said cylinder at lower altitudes to the extent of keeping said number of horse-power substantially constant at all altitudes.

In testimony whereof I have hereunto set my hand.

CHARLES WEISMANN.